United States Patent
Iwase

(10) Patent No.: US 12,487,611 B2
(45) Date of Patent: Dec. 2, 2025

(54) AUTOMATIC TRAVELING SYSTEM, AUTOMATIC TRAVELING METHOD, AND AUTOMATIC TRAVELING PROGRAM

(71) Applicant: Yanmar Holdings Co., Ltd., Osaka (JP)

(72) Inventor: Takuya Iwase, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 236 days.

(21) Appl. No.: 18/039,716

(22) PCT Filed: Nov. 29, 2021

(86) PCT No.: PCT/JP2021/043530
§ 371 (c)(1),
(2) Date: May 31, 2023

(87) PCT Pub. No.: WO2022/118771
PCT Pub. Date: Jun. 9, 2022

(65) Prior Publication Data
US 2024/0103527 A1    Mar. 28, 2024

(30) Foreign Application Priority Data
Dec. 2, 2020    (JP) .................................. 2020-200358

(51) Int. Cl.
*G05D 1/622*    (2024.01)
*A01B 69/04*    (2006.01)
(Continued)

(52) U.S. Cl.
CPC .......... *G05D 1/622* (2024.01); *A01B 69/008* (2013.01); *G05D 1/0214* (2013.01);
(Continued)

(58) Field of Classification Search
CPC .... G05D 1/622; G05D 1/0214; G05D 1/0251; G05D 1/224; G05D 2105/15; G05D 2107/21; A01B 69/008; G06V 20/58
See application file for complete search history.

(56) References Cited

U.S. PATENT DOCUMENTS

| | | | |
|---|---|---|---|
| 2006/0137652 A1* | 6/2006 | Umezu | E02F 9/2062 123/397 |
| 2006/0265103 A1* | 11/2006 | Orita | G05D 1/0217 700/245 |

(Continued)

FOREIGN PATENT DOCUMENTS

| | | |
|---|---|---|
| JP | 2009-116860 A | 5/2009 |
| JP | 2018-113938 A | 7/2018 |

(Continued)

OTHER PUBLICATIONS

Translation of WO-2011118260-A1, 13 pages (Year: 2011).*
(Continued)

*Primary Examiner* — Dale W Hilgendorf
(74) *Attorney, Agent, or Firm* — NORTON ROSE FULBRIGHT US LLP

(57) ABSTRACT

An acquisition processing part acquires a captured image from a camera which is installed on a work vehicle. A detection processing part detects an obstacle on the basis of the captured image which is acquired by the acquisition processing part. When an obstacle is detected by the detection processing part, a reception processing part receives a traveling stop instruction for stopping automatic traveling of the work vehicle or a traveling continuation instruction for continuing automatic traveling of the work vehicle. A traveling processing part stops the automatic traveling of the work vehicle when the reception processing part receives the traveling stop instruction, and continues the automatic trav- (Continued)

eling of the work vehicle when the reception processing part receives the traveling continuation instruction.

10 Claims, 10 Drawing Sheets

(51) Int. Cl.
    *G05D 1/00*       (2024.01)
    *G05D 1/224*    (2024.01)
    *G05D 105/15*   (2024.01)
    *G05D 107/20*   (2024.01)
    *G06V 20/58*    (2022.01)

(52) U.S. Cl.
    CPC ........... *G05D 1/0251* (2013.01); *G05D 1/224* (2024.01); *G06V 20/58* (2022.01); *G05D 2105/15* (2024.01); *G05D 2107/21* (2024.01)

(56) References Cited

U.S. PATENT DOCUMENTS

| | | | |
|---|---|---|---|
| 2015/0148192 A1* | 5/2015 | Lyon ..................... | B60W 10/06 477/203 |
| 2017/0066375 A1* | 3/2017 | Kato ...................... | G06V 20/58 |
| 2017/0118915 A1 | 5/2017 | Middelberg et al. | |
| 2017/0131722 A1 | 5/2017 | Hiramatsu et al. | |
| 2017/0268202 A1* | 9/2017 | Matsuzaki ........... | G05D 1/0061 |
| 2018/0118204 A1* | 5/2018 | Ito .......................... | G01S 13/931 |
| 2020/0148203 A1* | 5/2020 | Taniguchi ............. | G06V 40/103 |
| 2020/0225673 A1* | 7/2020 | Ebrahimi Afrouzi ....................... A47L 11/4011 | |
| 2020/0356088 A1* | 11/2020 | Schlacks, IV ....... | G05D 1/0027 |
| 2021/0132176 A1* | 5/2021 | Dingli .................. | G08G 1/0965 |
| 2023/0407600 A1* | 12/2023 | Danguchi ................ | E02F 9/24 |

FOREIGN PATENT DOCUMENTS

| | | | | |
|---|---|---|---|---|
| JP | 2019-103422 A | 6/2019 | | |
| JP | 2019-129760 A | 8/2019 | | |
| JP | 2020-18255 A | 2/2020 | | |
| JP | 2020-103146 A | 7/2020 | | |
| JP | 2020-123013 A | 8/2020 | | |
| JP | 2020-171318 A | 10/2020 | | |
| JP | 2020-178659 A | 11/2020 | | |
| WO | WO-2011118260 A1 * | 9/2011 | ............... | B60R 1/00 |
| WO | 2015/147149 A1 | 10/2015 | | |
| WO | 2016/143174 A1 | 9/2016 | | |

OTHER PUBLICATIONS

International Search Report dated Feb. 15, 2022 issued in corresponding PCT Application PCT/JP2021/043530.

European Extended Search Report dated Jan. 10, 2025 issued in EP Application No. 21900524.6.

* cited by examiner

AUTOMATIC TRAVELING SYSTEM, AUTOMATIC TRAVELING METHOD, AND AUTOMATIC TRAVELING PROGRAM

CROSS-REFERENCE TO RELATED APPLICATIONS

This application is a national stage application pursuant to 35 U.S.C. § 371 of International Application No. PCT/JP2021/043530, filed on Nov. 29, 2021, which claims priority under 35 U.S.C. § 119 to Japanese Patent Application No. 2020-200358 filed on Dec. 2, 2020, the disclosures of which are hereby incorporated by reference in their entireties.

TECHNICAL FIELD

The present invention relates to an automatic traveling system, an automatic traveling method, and an automatic traveling program for causing a work vehicle to automatically travel.

BACKGROUND ART

A work vehicle includes a function of stopping automatic traveling, in a case where the work vehicle detects an obstacle during automatic traveling along a predetermined traveling route in a field. Conventionally, there is known a technique that allows an operator of a work vehicle to switch between a normal mode in which automatic traveling of the work vehicle is stopped in a case where the work vehicle detects an obstacle, and a release mode in which traveling of the work vehicle is continued even when the work vehicle detects an obstacle (see, for example, Patent Literature 1).

CITATION LIST

Patent Literature

Patent Literature 1: Japanese Unexamined Patent Application Publication No. 2018-113938

DISCLOSURE OF INVENTION

Problems to be Solved by the Invention

However, in the conventional technique, in a case where the release mode is set, automatic traveling is continued, even when the work vehicle detects an obstacle. Therefore, there is a risk that the work vehicle may come into contact with the obstacle. As described above, while, in a system that uniformly stops automatic traveling, in a case where a work vehicle detects an obstacle, work efficiency is lowered, in a system that enables to continue automatic traveling, even when a work vehicle detects an obstacle, safety of the work vehicle may be lowered.

An object of the present invention is to provide an automatic traveling system, an automatic traveling method, and an automatic traveling program that enable to prevent lowering of work efficiency, while securing safety of a work vehicle.

Means for Solving the Problems

An automatic traveling system according to the present invention includes an acquisition processing part, a detection processing part, a reception processing part, and a traveling processing part. The acquisition processing part acquires a captured image from an imaging part installed on a work vehicle. The detection processing part detects an obstacle, based on the captured image to be acquired by the acquisition processing part. The reception processing part receives a traveling stop instruction to stop automatic traveling of the work vehicle, or a traveling continuation instruction to continue automatic traveling, in a case where the obstacle is detected by the detection processing part. The traveling processing part stops automatic traveling of the work vehicle, in a case where the reception processing part receives the traveling stop instruction, and continues automatic traveling of the work vehicle, in a case where the reception processing part receives the traveling continuation instruction.

An automatic traveling method according to the present invention is a method including, by one or more processors: acquiring a captured image from an imaging part installed on a work vehicle; detecting an obstacle, based on the captured image to be acquired; receiving a traveling stop instruction to stop automatic traveling of the work vehicle, or a traveling continuation instruction to continue automatic traveling, in a case where the obstacle is detected; and stopping automatic traveling of the work vehicle, in a case where the traveling stop instruction is received, and continuing automatic traveling of the work vehicle, in a case where the traveling continuation instruction is received.

An automatic traveling program according to the present invention is a program causing one or more processors to execute: acquiring a captured image from an imaging part installed on a work vehicle; detecting an obstacle, based on the captured image to be acquired; receiving a traveling stop instruction to stop automatic traveling of the work vehicle, or a traveling continuation instruction to continue automatic traveling, in a case where the obstacle is detected; and stopping automatic traveling of the work vehicle, in a case where the traveling stop instruction is received, and continuing automatic traveling of the work vehicle, in a case where the traveling continuation instruction is received.

Effect of the Invention

According to the present invention, it is possible to provide an automatic traveling system, an automatic traveling method, and an automatic traveling program that enable to prevent lowering of work efficiency, while securing safety of a work vehicle.

DESCRIPTION OF EMBODIMENTS

The following embodiment is an example embodying the present invention, and is not intended to limit the technical scope of the present invention.

Figure 1:
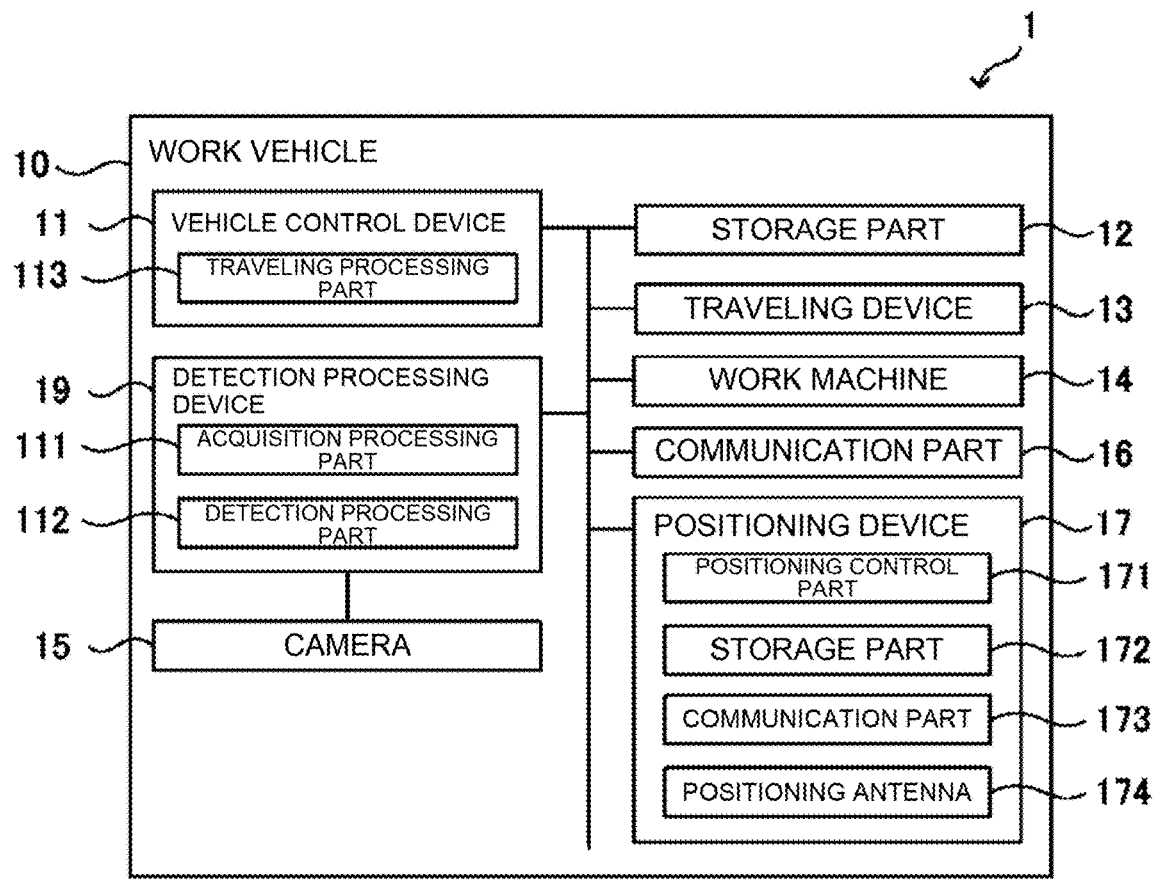
FIG. 1 is a block diagram illustrating a configuration of an automatic traveling system according to an embodiment of the present invention.
Figure 1:
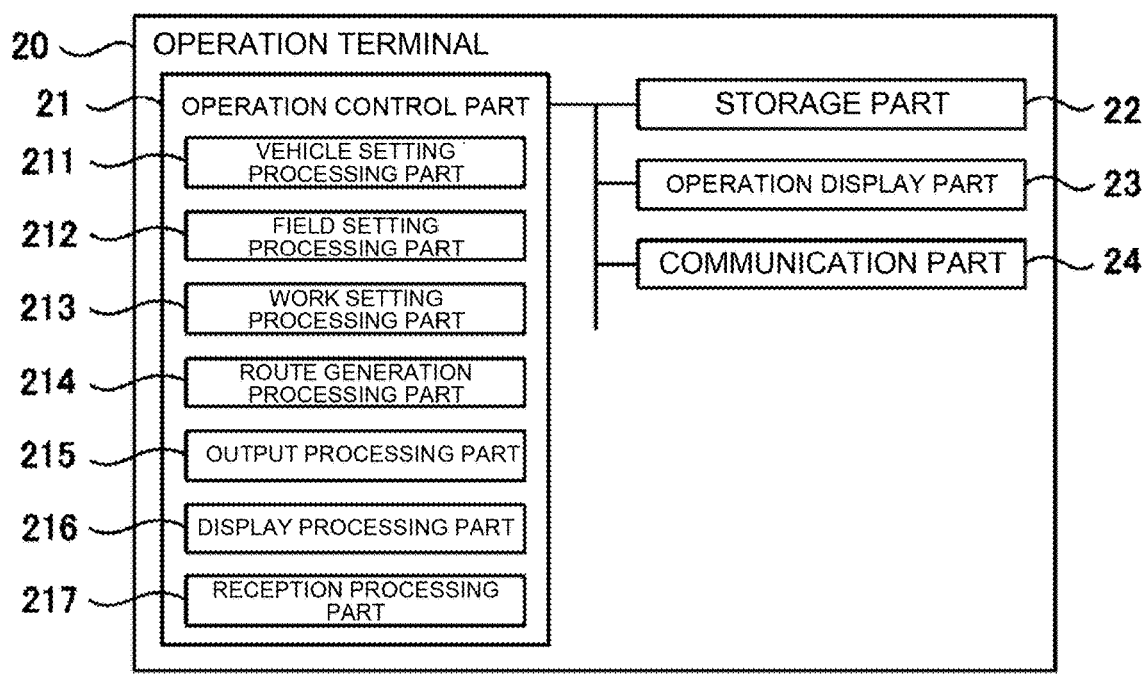

As illustrated in FIG. 1, an automatic traveling system 1 according to an embodiment of the present invention includes a work vehicle 10 and an operation terminal 20. The work vehicle 10 and the operation terminal 20 can communicate with each other via a communication network N1. For example, the work vehicle 10 and the operation terminal 20 can communicate with each other via a mobile phone network, a packet network, or a wireless LAN.

In the present embodiment, a case is described as an example, in which the work vehicle 10 is a tractor. Note that, as another embodiment, the work vehicle 10 may be a rice transplanter, a combine harvester, a construction machine, a snowplow, or the like. The work vehicle 10 is a so-called robot tractor provided with a configuration capable of automatically traveling (autonomously traveling) along a predetermined traveling route R within a field F (see FIG. 3). For example, the work vehicle 10 can automatically travel along the traveling route R that is generated in advance within the field F, based on position information on a current position of the work vehicle 10 to be computed by a positioning device 17.

Figure 3:
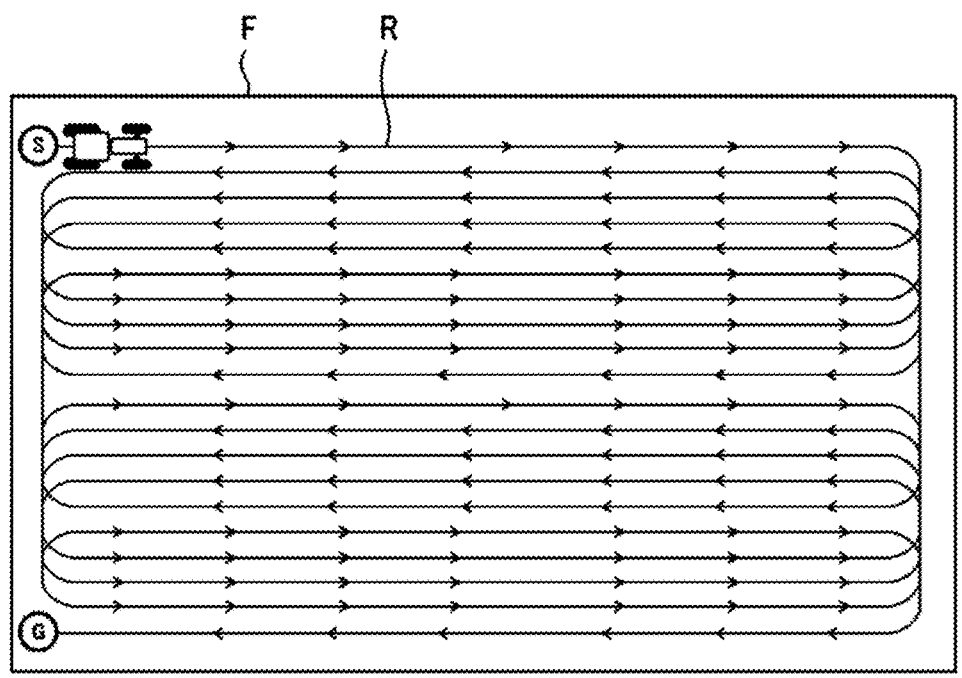
FIG. 3 is a diagram illustrating an example of a traveling route of the work vehicle according to the embodiment of the present invention.

For example, the work vehicle 10 travels in parallel back and forth from a work start position S to a work end position G in a work area of the field F illustrated in FIG. 3. An outer periphery of the field F is, for example, a headland area, and the work vehicle 10 travels while turning. The traveling route R is not limited to the route illustrated in FIG. 3, but is set as appropriate according to a content of work.

[Work Vehicle 10]

Figure 2:
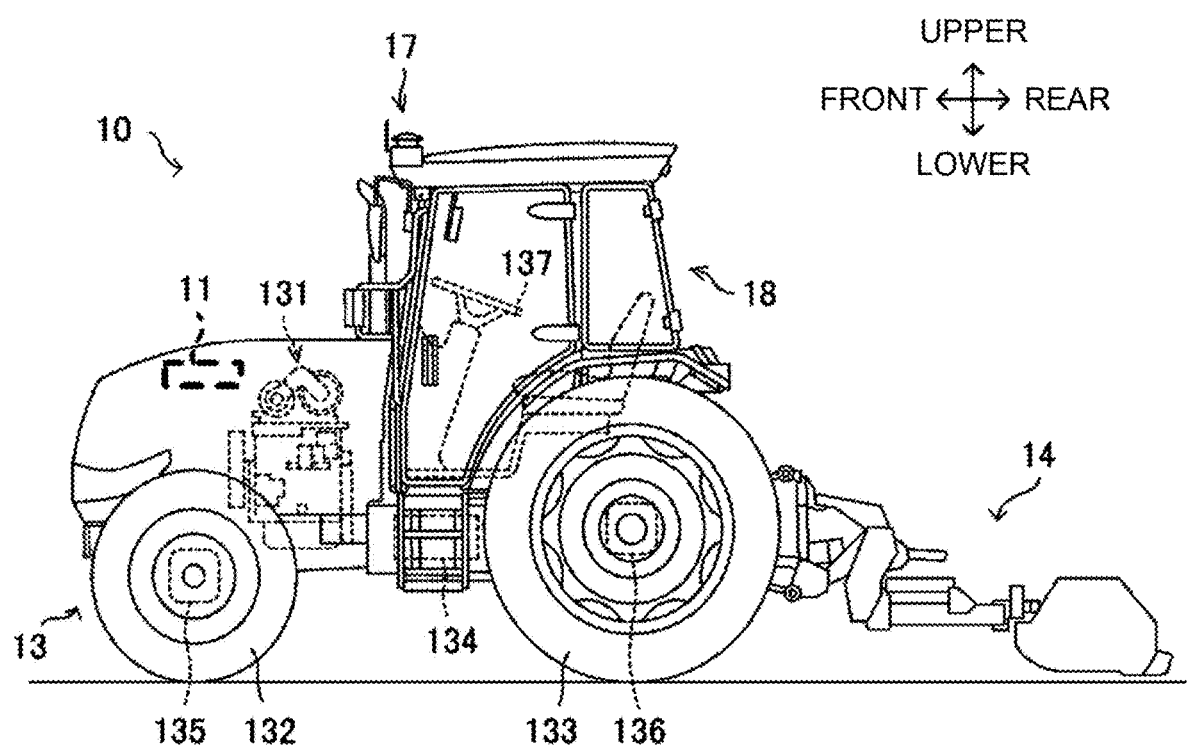
FIG. 2 is an external view illustrating an example of a work vehicle according to the embodiment of the present invention.

As illustrated in FIGS. 1 and 2, the work vehicle 10 includes a vehicle control device 11, a storage part 12, a traveling device 13, a work machine 14, a camera 15, a communication part 16, the positioning device 17, a detection processing device 19, and the like. The vehicle control device 11 is electrically connected to the storage part 12, the traveling device 13, the work machine 14, the positioning device 17, the detection processing device 19, and the like. Note that, the vehicle control device 11 and the positioning device 17 may be wirelessly communicable. The camera 15 is also electrically connected to the detection processing device 19.

The storage part 12 is a non-volatile storage part such as a hard disk drive (HDD) or a solid state drive (SSD) that stores various pieces of information. The storage part 12 stores a control program such as an automatic traveling program for causing the vehicle control device 11 to perform automatic traveling processing to be described later (see FIG. 10). For example, the automatic traveling program is non-transitorily recorded on a computer-readable recording medium such as a CD or a DVD, read by a predetermined reading device (not illustrated), and stored in the storage part 12. Note that, the automatic traveling program may be downloaded from a server (not illustrated) to the work vehicle 10 via the communication network N1, and stored in the storage part 12. Also, data on the traveling route R to be generated in the operation terminal 20, determination data for determining an obstacle, and the like are stored in the storage part 12. The determination data are data for determining a person, which is an example of an obstacle, and, for example, are data indicating a feature of a person, data on an image (sample image) indicating a part or whole of a person, and the like. The determination data may be stored in the detection processing device 19. In addition, work information (e.g., a turning pattern, a work order, and the like) may be stored in the storage part 12. Note that, the obstacle according to the present invention is an object that interferes with traveling of the work vehicle 10, and, for example, is a person, an animal, a device (such as other work vehicles), and the like.

The traveling device 13 is a driving part that causes the work vehicle 10 to travel. As illustrated in FIG. 2, the traveling device 13 includes an engine 131, front wheels 132, rear wheels 133, a transmission 134, a front axle 135, a rear axle 136, a steering wheel 137, and the like. Note that, the front wheel 132 and the rear wheel 133 are provided on each of left and right sides of the work vehicle 10. Further, the traveling device 13 is not limited to a wheel type in which the front wheels 132 and the rear wheels 133 are provided, but may be a crawler type in which a crawler is provided on left and right sides of the work vehicle 10.

The engine 131 is a drive source such as a diesel engine or a gasoline engine that is driven by using fuel to be replenished in an unillustrated fuel tank. The traveling device 13 may include an electric motor as a drive source together with the engine 131 or in place of the engine 131. Note that, the engine 131 is connected to an unillustrated generator, and electric power is supplied from the generator to an electrical component such as the vehicle control device 11 provided in the work vehicle 10, a battery, and the like. Note that, the battery is charged by electric power to be supplied from the generator. Further, electrical components such as the vehicle control device 11 and the positioning device 17 provided in the work vehicle 10 can also be driven by electric power to be supplied from the battery even after the engine 131 is stopped.

A driving force of the engine 131 is transmitted to the front wheels 132 via the transmission 134 and the front axle 135, and is transmitted to the rear wheels 133 via the transmission 134 and the rear axle 136. The driving force of the engine 131 is also transmitted to the work machine 14 via a PTO shaft (not illustrated). In a case where the work vehicle 10 performs automatic traveling, the traveling device 13 performs a traveling operation in accordance with a command of the vehicle control device 11.

The work machine 14 is, for example, a mower, a cultivator, a plow, a fertilizer applicator, a seeder, or the like, and is detachably attachable to the work vehicle 10. This allows the work vehicle 10 to perform various types of work by using each of the work machines 14. In the present embodiment, a case is described as an example in which the work machine 14 is a mower.

For example, the work machine 14 is mounted in such a way that the work machine 14 is offset to the left or to the right with respect to the work vehicle 10. For example, the work vehicle 10 performs mowing work by traveling within a field in a state that the directly-mounted work machine 14 is mounted in such a way the work machine 14 is offset to the left or to the right. Note that, the work machine 14 is not limited to a directly-mounted work machine (see FIG. 2) fixed to the work vehicle 10, but may also be a towed work machine towed by the work vehicle 10.

The camera 15 is a digital camera that captures an image of a subject, and outputs the image as digital image data. The camera 15 continuously captures a subject at a predetermined frame rate, generates frame images of a predetermined resolution, and sequentially transmits the frame images to the detection processing device 19. The camera 15 is an example of the imaging part according to the present invention.

Figure 4:
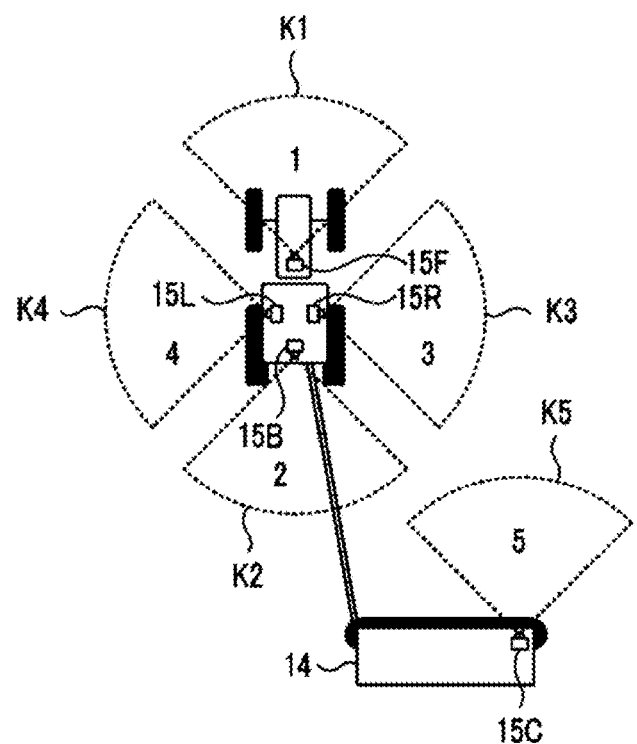
FIG. 4 is a diagram illustrating a position of a camera to be installed on the work vehicle according to the embodiment of the present invention.

In the present embodiment, five cameras 15 are installed at different locations of the work vehicle 10. Specifically, as illustrated in FIG. 4, a camera 15F (hereinafter, also referred to as "camera 1") is installed on a front portion of the work vehicle 10, a camera 15B (hereinafter, also referred to as "camera 2") is installed on a rear portion of the work vehicle 10, a camera 15R (hereinafter, also referred to as "camera 3") is installed on a right side portion of the work vehicle 10, a camera 15L (hereinafter, also referred to as "camera 4") is installed on a left side portion of the work vehicle 10, and a camera 15C (hereinafter, also referred to as "camera 5") is installed on a front right portion of the work machine 14. Note that, the camera 15 may be installed on the work vehicle 10 by, for example, a double-sided tape or the like.

In addition, each camera 15 has a predetermined imaging range (detection area) capable of imaging. For example, the camera 15F captures a detection area K1 in front of the work vehicle 10, the camera 15B captures a detection area K2 behind the work vehicle 10, the camera 15R captures a detection area K3 on the right side of the work vehicle 10, the camera 15L captures a detection area K4 on the left side of the work vehicle 10, and the camera 15C captures a detection area K5 on a front right portion of the work machine 14. Each camera 15 captures each detection area at a predetermined frame rate, and sequentially transmits the captured images to the detection processing device 19. The detection processing device 19 transmits the captured images and a detection result (determination result) to be described later to the vehicle control device 11 and the operation terminal 20.

Note that, the detection processing device 19 becomes communicable with the cameras 15 when the cameras 15 are electrically connected to the work vehicle 10. When the detection processing device 19 becomes communicable with the cameras 15, the detection processing device 19 acquires the number of the cameras 15, and identification information (device information) of each camera 15. The detection processing device 19 also outputs the acquired information on the number of the cameras 15 and the acquired identification information to the vehicle control device 11, and the vehicle control device 11 outputs the information on the number of the cameras 15 and the identification information to the operation terminal 20. The operator may add a camera 15, or change the installation position.

The steering wheel 137 is an actuating part to be actuated by the operator or the vehicle control device 11. In the traveling device 13, for example, an angle of the front wheel 132 is changed by an unillustrated hydraulic power steering mechanism or the like in response to an actuation of the steering wheel 137 by the vehicle control device 11, and a traveling direction of the work vehicle 10 is changed.

Further, the traveling device 13 includes, in addition to the steering wheel 137, an unillustrated shift lever, accelerator, brake, and the like to be actuated by the vehicle control device 11. In the traveling device 13, a gear of the transmission 134 is switched to a forward gear, a backward gear, or the like in response to an actuation of the shift lever by the vehicle control device 11, and a traveling mode of the work vehicle 10 is switched to forward, backward, and the like. The vehicle control device 11 also controls a speed of the engine 131 by actuating the accelerator. The vehicle control device 11 also actuates the brake, and brakes rotation of the front wheels 132 and the rear wheels 133 by using an electromagnetic brake.

The positioning device 17 is a communication device including a positioning control part 171, a storage part 172, a communication part 173, a positioning antenna 174, and the like. For example, as illustrated in FIG. 2, the positioning device 17 is provided on an upper portion of a cabin 18 in which the operator boards. An installation location of the positioning device 17 is not limited to the cabin 18. Furthermore, the positioning control part 171, the storage part 172, the communication part 173, and the positioning antenna 174 of the positioning device 17 may be disposed in a distributed manner at different positions in the work vehicle 10. Note that, as described above, the battery is connected to the positioning device 17, and the positioning device 17 is operable even when the engine 131 is stopped. Also, for example, a mobile phone terminal, a smartphone, a tablet terminal, or the like may be substituted as the positioning device 17.

The positioning control part 171 is a computer system including one or more processors, and a storage memory such as a non-volatile memory and a RAM. The storage part 172 is a non-volatile memory or the like that stores a program for causing the positioning control part 171 to perform positioning processing, and data such as positioning information and movement information. For example, the program is non-transitorily recorded in a computer-readable recording medium such as a CD, or a DVD, read by a predetermined reading device (not illustrated), and stored in the storage part 172. Note that, the program may be downloaded from a server (not illustrated) to the positioning device 17 via the communication network N1, and stored in the storage part 172.

The communication part 173 is a communication interface that connects the positioning device 17 to the communication network N1 in a wired or wireless manner, and performs data communication with an external device such as a base station server via the communication network N1 in accordance with a predetermined communication protocol.

The positioning antenna 174 is an antenna that receives a radio wave (a GNSS signal) to be transmitted from a satellite.

The positioning control part 171 computes a current position of the work vehicle 10, based on a GNSS signal to be received from a satellite by the positioning antenna 174. For example, in a case where the work vehicle 10 automatically travels within the field F, and the positioning antenna 174 receives a radio wave (such as a transmission time, and orbit information) to be transmitted from each of a plurality of satellites, the positioning control part 171 computes a distance between the positioning antenna 174 and each satellite, and computes a current position (a latitude and a longitude) of the work vehicle 10, based on the computed distance. The positioning control part 171 also computes a current position of the work vehicle 10 by utilizing correction information associated with a base station (reference station) near the work vehicle 10. Positioning by a real-time kinematic method (RTK-GPS positioning method (RTK method)) may also be performed. In this way, the work vehicle 10 performs automatic traveling by utilizing positioning information by the RTK method.

The vehicle control device 11 and the detection processing device 19 include control devices such as a CPU, a ROM, and a RAM. The CPU is a processor that executes various pieces of arithmetic processing. The ROM is a non-volatile storage part that stores in advance a control program such as a BIOS and an OS for causing the CPU to execute various pieces of arithmetic processing. The RAM is a volatile or non-volatile storage part that stores various pieces of information, and is used as a transitory storage memory (work area) in which the CPU executes various pieces of processing. Further, the vehicle control device 11 and the detection processing device 19 control the work vehicle 10 by causing the CPU to execute various control programs stored in advance in the ROM or the storage part 12.

The detection processing device 19 acquires a captured image from the camera 15, and determines whether a detection area includes an obstacle (e.g., a person), based on the captured image. Specifically, as illustrated in FIG. 1, the detection processing device 19 includes various processing parts such as an acquisition processing part 111 and a detection processing part 112. The detection processing device 19 functions as the various processing parts by causing the CPU to execute various pieces of processing according to the automatic traveling program. In addition, some or all of the processing parts may be constituted of an electronic circuit. Note that, the automatic traveling program may be a program for causing a plurality of processors to function as the processing parts.

The acquisition processing part 111 acquires a captured image from one or more cameras 15. For example, the acquisition processing part 111 acquires in order a captured image of each of the detection areas K1 to K5 from each of the five cameras 15F, 15B, 15R, 15L, and 15C installed on the work vehicle 10 and the work machine 14 frame by frame. The acquisition processing part 111 stores, in the storage part 12, the acquired captured images together with an imaging time.

The acquisition processing part 111 also outputs image data on the acquired captured images to the operation terminal 20. The acquisition processing part 111 is an example of the acquisition processing part according to the present invention.

The detection processing part 112 detects an obstacle (e.g., a person) in the captured image to be acquired by the acquisition processing part 111. Specifically, the detection processing part 112 determines whether a person is included in a detection area, based on the captured image. For example, the detection processing part 112 determines presence or absence of a person in a detection area by analyzing the captured image, and collating the captured image with the determination data stored in the storage part 12 or the detection processing device 19. The detection processing part 112 also performs determination processing for each of the captured images to be acquired in order by the acquisition processing part 111. For example, the detection processing part 112 performs the determination processing for a captured image by the camera 15F, then, performs the determination processing for a captured image by the camera 15B, then, performs the determination processing for a captured image by the camera 15R, then, performs the determination processing for a captured image by the camera 15L, and then, performs the determination processing for a captured image by the camera 15C. The detection processing part 112 transmits a detection result (determination result) to the operation terminal 20. The detection processing part 112 is an example of the detection processing part according to the present invention.

As illustrated in FIG. 1, the vehicle control device 11 includes various processing parts such as the traveling processing part 113. Note that, the vehicle control device 11 functions as the various processing parts by causing the CPU to execute various pieces of processing according to the automatic traveling program. Also, some or all of the processing parts may be constituted of an electronic circuit. Note that, the automatic traveling program may be a program for causing a plurality of processors to function as the processing parts.

The traveling processing part 113 controls traveling of the work vehicle 10. Specifically, when the traveling processing part 113 acquires a work start instruction from the operation terminal 20, the traveling processing part 113 causes the work vehicle 10 to start automatic traveling. For example, when the operator presses a work start button on an operation screen of the operation terminal 20, the operation terminal 20 outputs a work start instruction to the work vehicle 10. When the traveling processing part 113 acquires the work start instruction from the operation terminal 20, the traveling processing part 113 causes the work vehicle 10 to start automatic traveling. This allows the work vehicle 10 to start automatic traveling along the traveling route R, and a work by the work machine 14 is started. Note that, the traveling route R along which the work vehicle 10 travels is generated, for example, by the operation terminal 20. The work vehicle 10 acquires the traveling route R from the operation terminal 20, and automatically travels within the field F along the traveling route R.

Further, when the traveling processing part 113 acquires a traveling stop instruction from the operation terminal 20, the traveling processing part 113 causes the work vehicle 10 to stop automatic traveling. For example, when the operator presses a traveling stop button on the operation screen of the operation terminal 20, the operation terminal 20 outputs a traveling stop instruction to the work vehicle 10. Also, for example, in a case where the detection processing part 112 detects a person, and in a case where the operator does not give either a traveling stop instruction or a traveling continuation instruction on the operation screen of the operation terminal 20 for a predetermined time, the operation terminal 20 outputs a traveling stop instruction to the work vehicle 10. When the traveling processing part 113 acquires the traveling stop instruction from the operation terminal 20, the travel processing part 113 causes the work vehicle 10 to stop automatic traveling. This allows the work vehicle 10 to stop automatic traveling, and a work by the work machine 14 is stopped. Specific examples of the traveling stop instruction and the traveling continuation instruction are described later.

Further, when the traveling processing part 113 acquires a traveling resume instruction from the operation terminal 20, the traveling processing part 113 causes the work vehicle 10 to resume automatic traveling. For example, when the detection processing part 112 detects a person, and the operator presses a traveling resume button on the operation screen of the operation terminal 20 after the work vehicle 10 stops traveling, the operation terminal 20 outputs a traveling resume instruction to the work vehicle 10. When the traveling processing part 113 acquires the traveling resume instruction from the operation terminal 20, the traveling processing part 113 causes the work vehicle 10 to resume automatic traveling. This causes the work vehicle 10 to resume automatic traveling along the traveling route R again. The traveling processing part 113 is an example of the traveling processing part according to the present invention.

[Operation Terminal 20]

As illustrated in FIG. 1, the operation terminal 20 is an information processing device including an operation control part 21, a storage part 22, an operation display part 23, a communication part 24, and the like. The operation terminal 20 may be constituted of a mobile terminal such as a tablet terminal or a smartphone.

The communication part 24 is a communication interface that connects the operation terminal 20 to the communication network N1 in a wired or wireless manner, and performs data communication with an external device such as one or more work vehicles 10 via the communication network N1 in accordance with a predetermined communication protocol.

The operation display part 23 is a user interface including a display part such as a liquid crystal display or an organic EL display that displays various pieces of information, and an operation part such as a touch panel that receives an operation, a mouse, or a keyboard. An operator can perform, on an operation screen to be displayed on the display part, an operation of registering various pieces of information (such as work vehicle information, field information, and work information to be described later) by operating the operation part. Further, the operator can give a work start instruction, a traveling stop instruction, a traveling resume instruction, and the like to the work vehicle 10 by operating the operation part. Furthermore, the operator can recognize a traveling state of the work vehicle 10 that is automatically traveling along the traveling route R within the field F by a traveling trajectory to be displayed on the operation terminal 20 at a location away from the work vehicle 10.

The storage part 22 is a non-volatile storage part such as an HDD or an SSD that stores various pieces of information. The storage part 22 stores a control program such as an automatic traveling program for causing the operation control part 21 to perform automatic traveling processing (see FIG. 10) to be described later. For example, the automatic traveling program is non-transitorily recorded in a computer-readable recording medium such as a CD or a DVD, read by a predetermined reading device (not illustrated), and stored in the storage part 22. Note that, the automatic traveling program may be downloaded from a server (not illustrated) to the operation terminal 20 via the communication network N1, and stored in the storage part 22.

The operation control part 21 includes control devices such as a CPU, a ROM, and a RAM. The CPU is a processor that executes various pieces of arithmetic processing. The ROM is a non-volatile storage part that stores in advance a control program such as a BIOS and an OS for causing the CPU to execute various pieces of arithmetic processing. The RAM is a volatile or non-volatile storage part that stores various pieces of information, and is used as a transitory storage memory (work area) in which the CPU executes various pieces of processing. Further, the operation control part 21 controls the operation terminal 20 by causing the CPU to execute various control programs stored in advance in the ROM or the storage part 22.

As illustrated in FIG. 1, the operation control part 21 includes various processing parts such as a vehicle setting processing part 211, a field setting processing part 212, a work setting processing part 213, a route generation processing part 214, an output processing part 215, a display processing part 216, and a reception processing part 217. Note that, the operation control part 21 functions as the various processing parts by causing the CPU to execute various pieces of processing according to the control program. Also, some or all of the processing parts may be constituted of an electronic circuit. Note that, the control program may be a program for causing a plurality of processors to function as the processing parts.

The vehicle setting processing part 211 sets information (hereinafter, referred to as work vehicle information) related to the work vehicle 10. The vehicle setting processing part 211 sets information such as a model of the work vehicle 10, a position of the positioning antenna 174 mounted on the work vehicle 10, a type of the work machine 14, a size and a shape of the work machine 14, a position of the work machine 14 relative to the work vehicle 10, a vehicle speed and an engine speed of the work vehicle 10 during work, a vehicle speed and an engine speed of the work vehicle 10 during turning, and the like by performing a registration operation on the operation terminal 20 by the operator.

The field setting processing part 212 sets information (hereinafter, referred to as field information) related to the field F. The field setting processing part 212 sets information such as a position and a shape of the field F, the work start position S where work is started, the work end position G (see FIG. 3) where work is finished, and a work direction by performing a registration operation on the operation terminal 20.

Note that, the work direction means a direction in which the work vehicle 10 is caused to travel while allowing the work machine 14 to perform work in a work area, which is an area acquired by excluding a non-work area such as a headland, or a non-cultivated land from the field F.

Information on a position and a shape of the field F can be automatically acquired, for example, by allowing the operator to board the work vehicle 10, and drive the work vehicle 10 in such a way as to travel around along an outer periphery of the field F, and recording a transition of position information of the positioning antenna 174 at the time. Further, a position and a shape of the field F can also be acquired by allowing the operator to operate the operation terminal 20 in a state that a map is displayed on the operation terminal 20, and based on a polygonal shape acquired by determining a plurality of points on the map. An area to be determined by the acquired position and shape of the field F is an area (traveling area) where the work vehicle 10 is allowed to travel.

The work setting processing part 213 sets information (hereinafter, referred to as work information) on how the work is specifically performed. The work setting processing part 213 is configured in such a way that presence or absence of a cooperative work between a work vehicle 10 (unmanned tractor) and a manned work vehicle 10, the number of skips, which is the number of work routes to be skipped in a case where the work vehicle 10 turns in a headland, a width of the headland, a width of a non-cultivated land, and the like are settable, as the work information.

The route generation processing part 214 generates the traveling route R, which is a route along which the work vehicle 10 is caused to automatically travel, based on the setting information. The traveling route R is, for example, a work route (see FIG. 3) from the work start position S to the work end position G. The traveling route R illustrated in FIG. 3 is a route along which the work vehicle 10 is caused to travel back and forth in parallel in the work area of the field F. The route generation processing part 214 can generate and store the traveling route R of the work vehicle 10, based on pieces of the setting information set by the vehicle setting processing part 211, the field setting processing part 212, and the work setting processing part 213.

Specifically, the route generation processing part 214 generates the traveling route R (see FIG. 3), based on the work start position S and the work end position G registered in field settings. The traveling route R is not limited to the route illustrated in FIG. 3.

The work vehicle 10 is configured in such a way that data on the traveling route R generated in the operation terminal 20 are transferred to the work vehicle 10 and stored in the storage part 12, and the work vehicle 10 can autonomously travel along the traveling route R while detecting a current position of the work vehicle 10 by the positioning antenna 174. Note that, a current position of the work vehicle 10 usually coincides with a position of the positioning antenna 174.

The work vehicle 10 according to the present embodiment travels in the substantially rectangular-shaped field F as illustrated in FIG. 3. The work vehicle 10 is configured to be able to automatically travel, in a case where a current position is located within the field F, and is not able to automatically travel, in a case where a current position is located outside the field F (such as on a public road). The work vehicle 10 is also configured to be able to automatically travel, in a case where, for example, a current position coincides with the work start position S.

In a case where a current position of the work vehicle 10 coincides with the work start position S, and a work start button is pressed on the operation screen by the operator and a work start instruction is given, the work vehicle 10 starts automatic traveling by the traveling processing part 113, and a work by the work machine 14 is started (see FIG. 2). In other words, the operation control part 21 permits automatic traveling of the work vehicle 10 on a condition that a current position coincides with the work start position S. Note that, the condition for permitting automatic traveling of the work vehicle 10 is not limited to the aforementioned condition.

The output processing part 215 outputs, to the work vehicle 10, information on the traveling route R generated by the route generation processing part 214. The output processing part 215 can also instruct the work vehicle 10 to start and stop automatic traveling, and the like by transmitting a control signal to the work vehicle 10 via the communication part 24. This allows the work vehicle 10 to automatically travel.

For example, the traveling processing part 113 causes the work vehicle 10 to automatically travel from the work start position S to the work end position G, based on the traveling route R acquired from the operation terminal 20. Also, the traveling processing part 113 may cause the work vehicle 10 to automatically travel from the work end position G to an entrance of the field F, when the work vehicle 10 finishes the work. In a case where the work vehicle 10 is automatically traveling, the operation control part 21 can receive, from the work vehicle 10, a state (such as a position and a traveling speed) of the work vehicle 10, and cause the operation display part 23 to display the state.

The display processing part 216 causes the operation display part 23 to display various pieces of information. For example, the display processing part 216 causes the operation display part 23 to display an operation screen for registering work vehicle information, field information, work information, and the like, a setting screen D1 (see FIGS. 5A and 5B) for setting a layout of image display columns L1 that display a captured image of each of the plurality of cameras 15 installed on the work vehicle 10, a traveling state screen D2 (see FIG. 6A to FIG. 8B) that displays the captured images, a traveling selection screen D3 (see FIG. 9) for selecting a traveling stop instruction to stop traveling of the work vehicle 10, or a traveling continuation instruction to continue traveling, and the like.

The reception processing part 217 receives various operations from the operator. For example, the reception processing part 217 receives an operation (an example of a setting operation according to the present invention) of setting a layout of the image display columns L1 from the operator. Also, the reception processing part 217 receives, from the operator, a work start instruction of causing the work vehicle 10 to start working. The reception processing part 217 also receives, from the operator, a traveling stop instruction of causing the work vehicle 10 during automatic traveling to stop traveling. The reception processing part 217 also receives, from the operator, a traveling stop instruction or a traveling continuation instruction of the work vehicle 10, in a case where the work vehicle 10 detects a person. The reception processing part 217 also receives, from the operator, a traveling resume instruction of causing the work vehicle 10 that has stopped traveling to resume traveling. When the reception processing part 217 receives each of the instructions, the output processing part 215 outputs each of the instructions to the work vehicle 10. The reception processing part 217 is an example of the reception processing part according to the present invention.

When the traveling processing part 113 of the work vehicle 10 acquires a work start instruction from the operation terminal 20, the traveling processing part 113 causes the work vehicle 10 to start traveling and working. Also, when the traveling processing part 113 acquires a traveling stop instruction from the operation terminal 20, the traveling processing part 113 causes the work vehicle 10 to stop traveling and working. Also, when the traveling processing part 113 acquires a traveling continuation instruction from the operation terminal 20, the traveling processing part 113 causes the work vehicle 10 to continue traveling and working. Also, when the traveling processing part 113 acquires a traveling resume instruction from the operation terminal 20, the traveling processing part 113 causes the work vehicle 10 to resume traveling and working.

Figure 5A:
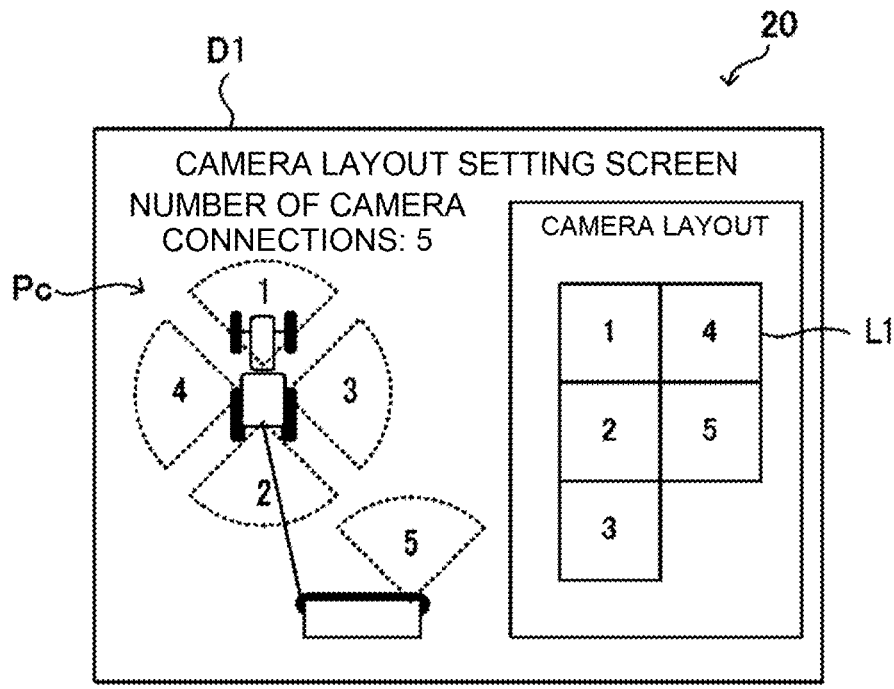
FIG. 5A is a diagram illustrating an example of a setting screen of a camera layout to be displayed on an operation terminal according to the embodiment of the present invention.
Figure 5B:
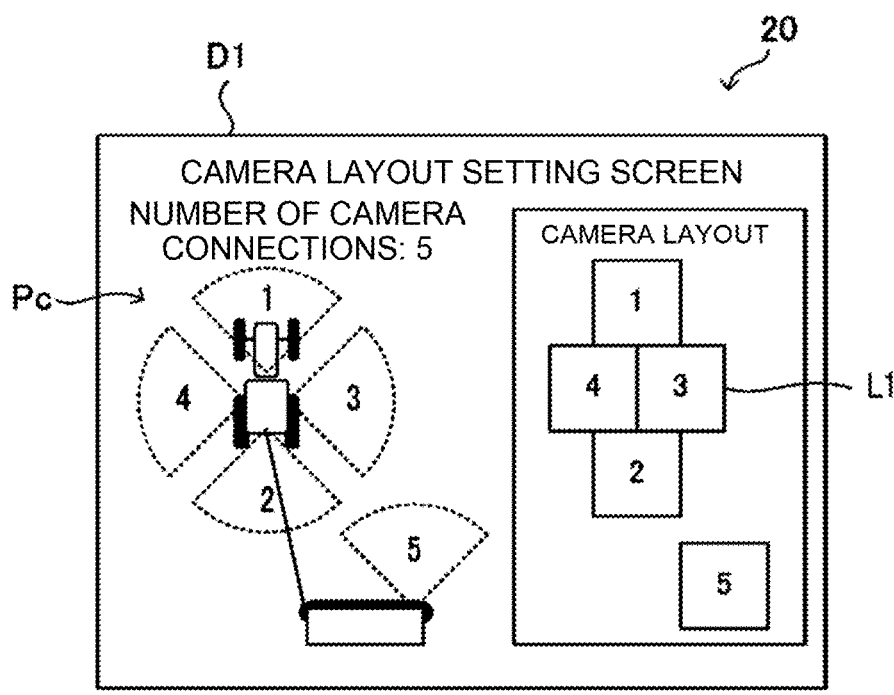
FIG. 5B is a diagram illustrating an example of a setting screen of a camera layout to be displayed on the operation terminal according to the embodiment of the present invention.

Herein, a specific example is described. For example, in a case where the five cameras 15F, 15B, 15R, 15L, and 15C (cameras 1 to 5) are installed on the work vehicle 10 as illustrated in FIG. 4, and the display processing part 216 acquires the number of the cameras 15 and identification information to be acquired from the work vehicle 10, the display processing part 216 causes the operation display part 23 to display the setting screen D1 for setting a layout of the image display columns L1. For example, as illustrated in FIG. 5A, the display processing part 216 causes to display five image display columns L1 that display captured images of the camera 15F (camera 1), the camera 15B (camera 2), the camera 15R (camera 3), the camera 15L (camera 4), and the camera 15C (camera 5) side by side in any order. Also, as illustrated in FIG. 5B, for example, the display processing part 216 may arrange the five image display columns L1 at a position associated with an installation layout of the cameras 15 on the work vehicle 10. The operator may also change the layout of the image display columns L1 on the setting screen D1. For example, the operator may arrange each image display column L1 at a desired position on the setting screen D1 by a drag-and-drop operation, and the like.

Further, as illustrated on a left portion of the setting screen D1, the display processing part 216 may desirably display an image (camera placement image Pc) capable of identifying a placement position of each camera 15 relative to the work vehicle 10. This allows the operator to easily recognize a correlation between the placement position of each camera 15 and the layout of the image display columns L1. Note that, the display processing part 216 may omit the camera placement image Pc on the setting screen D1.

Figure 6A:
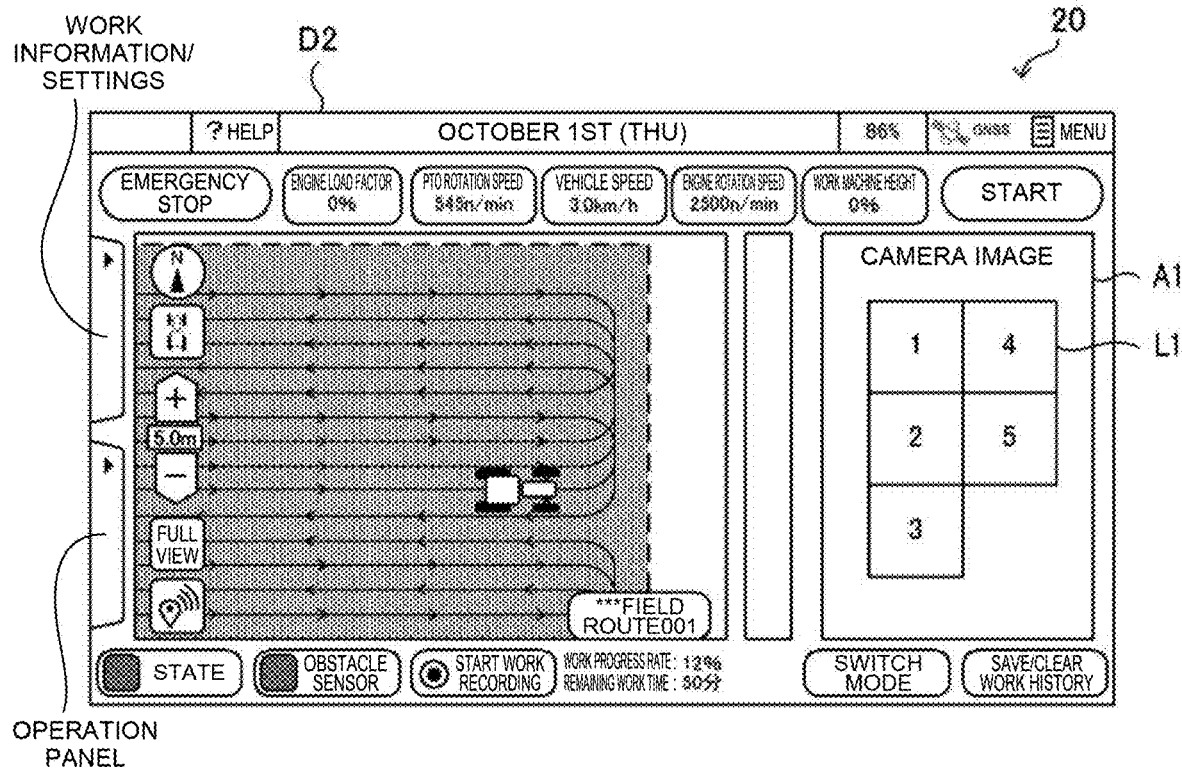
FIG. 6A is a diagram illustrating an example of a camera image to be displayed on the operation terminal according to the embodiment of the present invention.
Figure 6B:
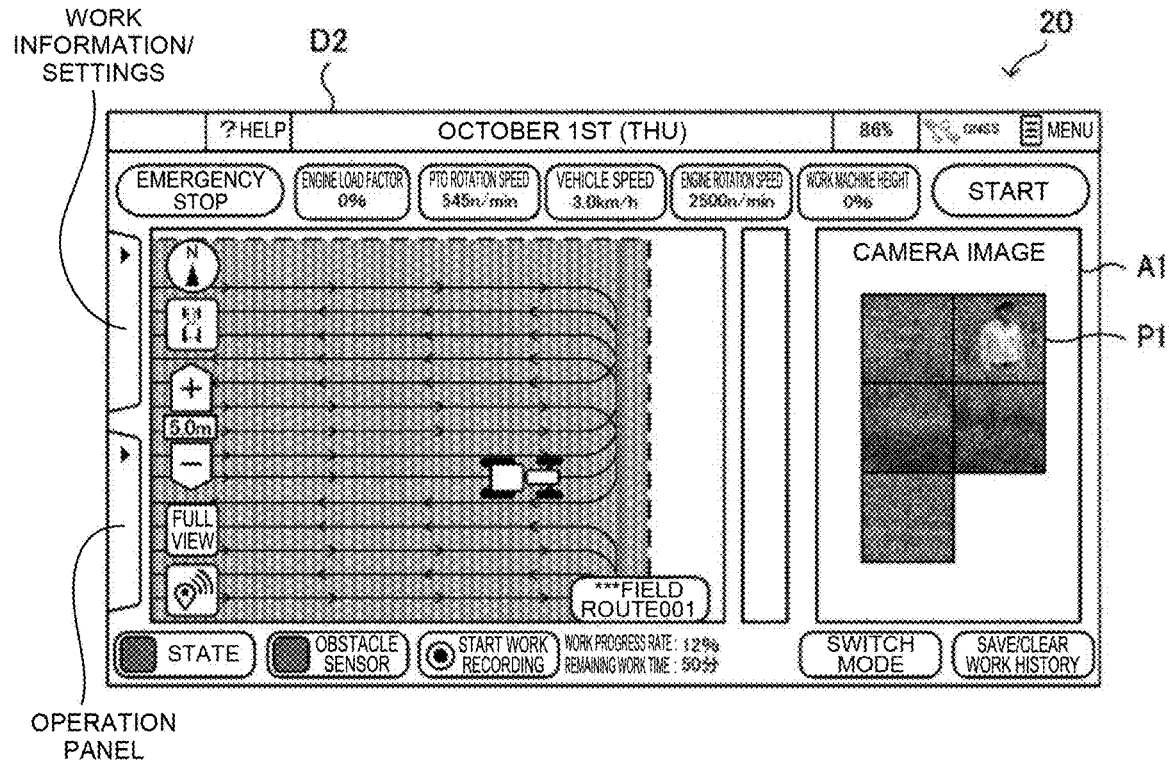
FIG. 6B is a diagram illustrating an example of a camera image to be displayed on the operation terminal according to the embodiment of the present invention.

The display processing part 216 arranges and displays a plurality of captured images P1 according to the setting operation on the setting screen D1. For example, when the layout of the image display columns L1 illustrated in FIG. 5A is set, as illustrated in FIG. 6A, the display processing part 216 causes to display a camera image display column A1 that displays a captured image of each camera 15 on the traveling state screen D2 that displays an automatic traveling state of the work vehicle 10. The traveling state screen D2 displays a current state of the work vehicle 10 during automatic traveling in real time. The operator can recognize a current traveling status and work status of the work vehicle 10 on the traveling state screen D2. The display processing part 216 causes to display each image display column L1 in the camera image display column A1 according to the layout set on the setting screen D1. FIG. 6B illustrates an example of the traveling state screen D2 on which the captured image P1 is displayed in each image display column L1. The captured image P1 to be displayed in each image display column L1 is updated in real time.

Figure 7A:
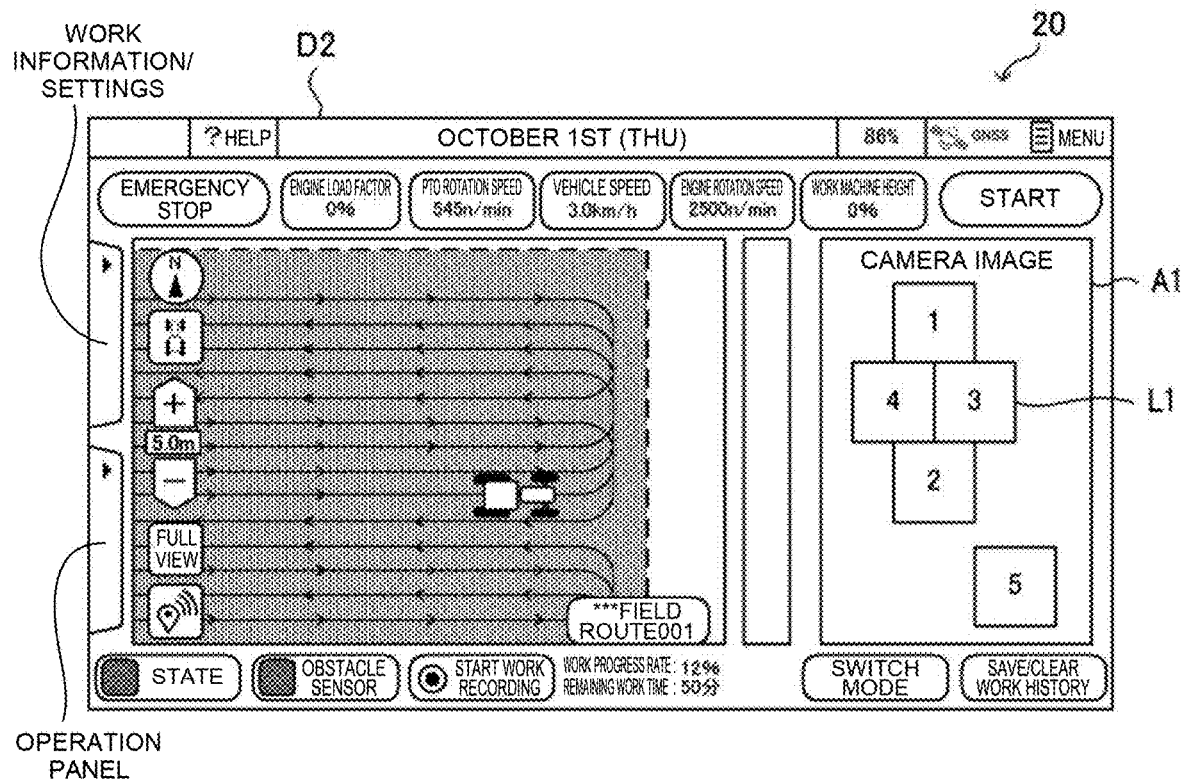
FIG. 7A is a diagram illustrating an example of a camera image to be displayed on the operation terminal according to the embodiment of the present invention.
Figure 7B:
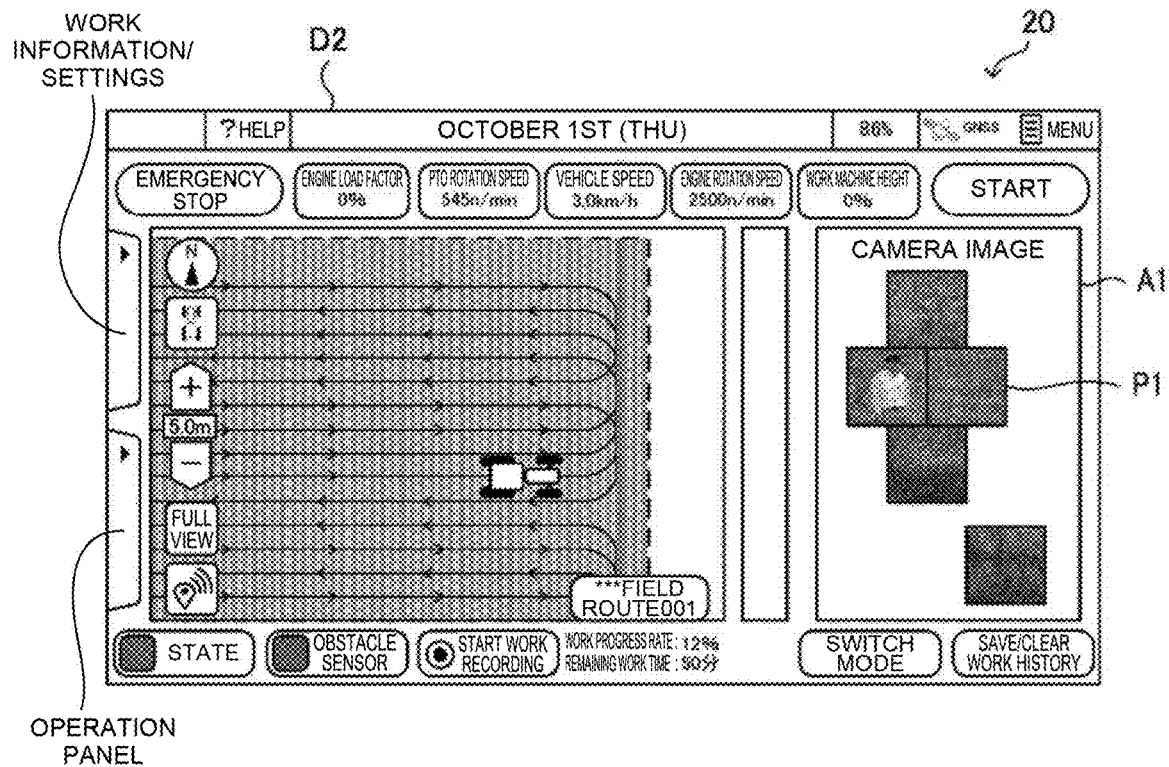
FIG. 7B is a diagram illustrating an example of a camera image to be displayed on the operation terminal according to the embodiment of the present invention.

In a case where the image display column L1 is set on the layout illustrated in FIG. 5B, the display processing part 216 causes to display each image display column L1 illustrated in FIG. 7A. FIG. 7B illustrates an example of the traveling state screen D2 on which the captured image P1 is displayed in each image display column L1.

Herein, in a case where an obstacle (in this case, a person) is detected in at least one of the captured images of the five cameras 15, the operation terminal 20 performs the following processing. For example, in a case where the detection processing part 112 of the work vehicle 10 detects a person in a captured image acquired from the camera 15L (camera 4), the detection processing part 112 outputs, to the operation terminal 20, a determination result indicating that a person is detected, and identification information of the camera 15L (camera 4) associated with the captured image.

The acquisition processing part 111 also outputs, to the operation terminal 20, image data on the captured image acquired from each camera 15.

Figure 8A:
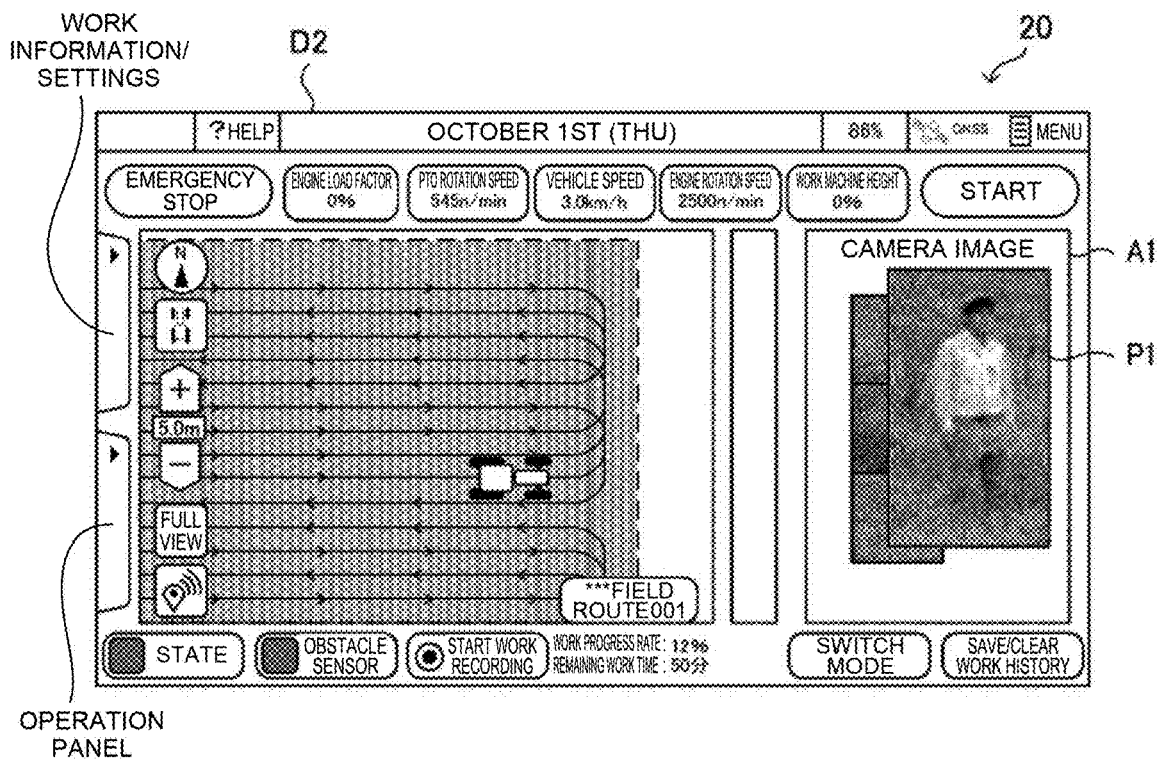
FIG. 8A is a diagram illustrating an example of a camera image to be displayed on the operation terminal according to the embodiment of the present invention.

When the display processing part 216 of the operation terminal 20 acquires the image data from the work vehicle 10, the display processing part 216 causes to display the captured image P1 in each image display column L1. Also, when the display processing part 216 acquires the determination result and the identification information from the work vehicle 10, as illustrated in FIG. 8A, the display processing part 216 causes to display the image display column L1 and the captured image P1 associated with the camera 15L (camera 4) in an enlarged manner. This allows the image of the person detected as an obstacle to be displayed in an enlarged manner.

Figure 8B:
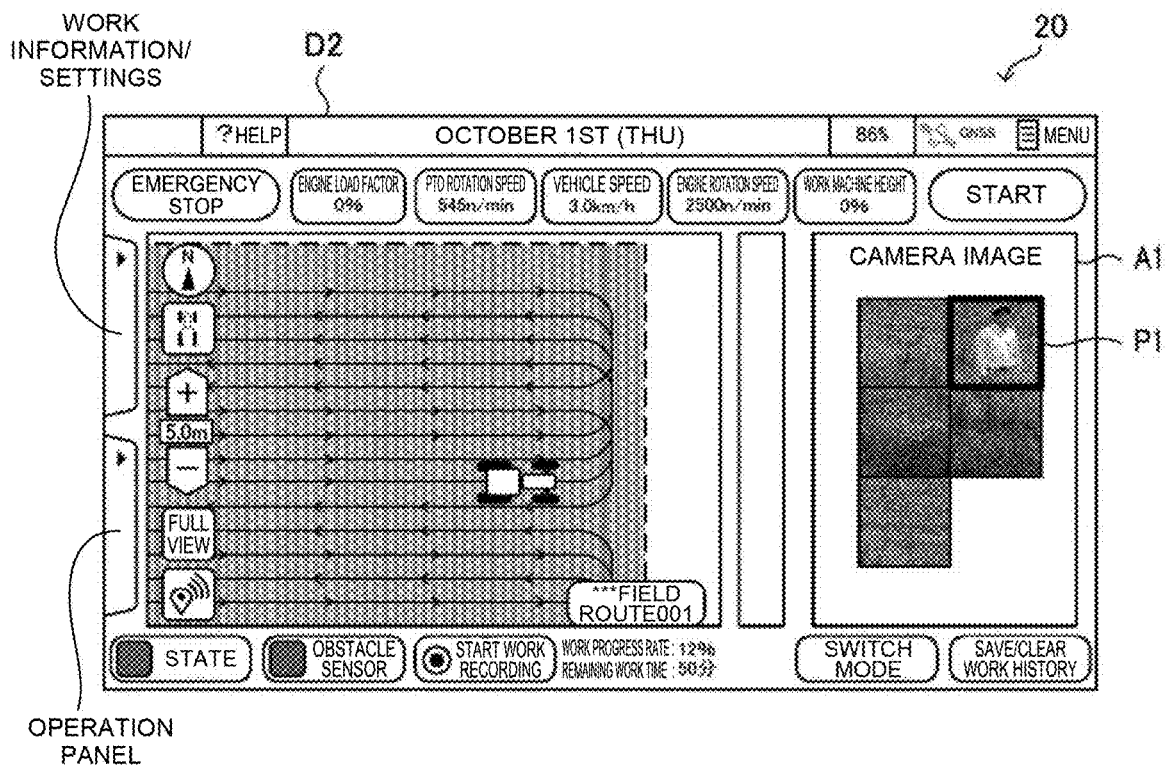
FIG. 8B is a diagram illustrating an example of a camera image to be displayed on the operation terminal according to the embodiment of the present invention.

As another embodiment, the display processing part 216 may cause to display the image display column L1 associated with the camera 15L (camera 4) in a highlighted manner among the plurality of image display columns L1. For example, as illustrated in FIG. 8B, the display processing part 216 causes to display a frame of the image display column L1 associated with the camera 15L (camera 4) in a bold line. The display processing part 216 may also cause to display the image display column L1 associated with the camera 15L (camera 4) in color, by turning light, or by blinking. The display processing part 216 may also cause to display only the image display column L1 associated with the camera 15L (camera 4) in the camera image display column A1, and hide the image display columns L1 associated with the other cameras 15.

Figure 9:
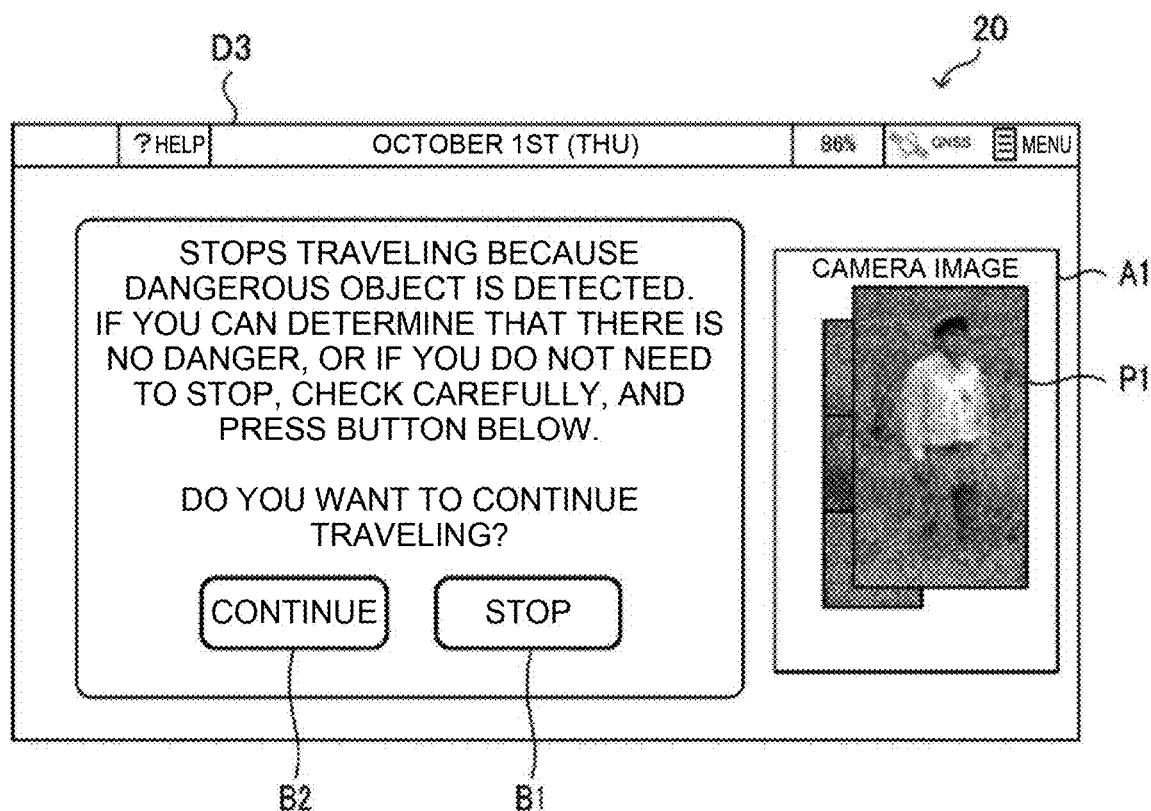
FIG. 9 is a diagram illustrating an example of a traveling selection screen to be displayed on the operation terminal according to the embodiment of the present invention.

When the display processing part 216 acquires, from the work vehicle 10, a determination result indicating that a person is detected, the display processing part 216 causes to display, on the operation display part 23, the traveling selection screen D3 for selecting a traveling stop instruction to stop traveling of the work vehicle 10, or a traveling continuation instruction to continue traveling. FIG. 9 illustrates an example of the traveling selection screen D3. The display processing part 216 causes to display, on the traveling selection screen D3, a message indicating that an obstacle is detected, a message for selecting whether to stop traveling or continue traveling, a traveling stop button B1 to stop traveling, and a traveling continuation button B2 to continue traveling. When the operator presses the traveling stop button B1 on the traveling selection screen D3, the reception processing part 217 receives a traveling stop instruction. When the reception processing part 217 receives the traveling stop instruction, the output processing part 215 outputs the traveling stop instruction to the work vehicle 10. When the traveling processing part 113 of the work vehicle 10 acquires the traveling stop instruction from the operation terminal 20, the traveling processing part 113 causes the work vehicle 10 to stop traveling and working.

In contrast, when the operator presses the traveling continuation button B2 on the traveling selection screen D3, the reception processing part 217 receives a traveling continuation instruction. When the reception processing part 217 receives the traveling continuation instruction, the output processing part 215 outputs the traveling continuation instruction to the work vehicle 10. When the traveling processing part 113 of the work vehicle 10 acquires the traveling continuation instruction from the operation terminal 20, the traveling processing part 113 does not stop traveling and working of the work vehicle 10, and the work vehicle 10 continues traveling and working. Note that, in a case where the reception processing part 217 receives the traveling continuation instruction, the output processing part 215 may be configured not to output the traveling continuation instruction to the work vehicle 10. Thus, since the traveling processing part 113 does not perform processing of causing the work vehicle 10 to stop traveling, consequently, the work vehicle 10 continues traveling and working.

Herein, it is conceivable that the operator does not press either the traveling stop button B1 or the traveling continuation button B2 on the traveling selection screen D3. For example, it is conceivable that the operator does not notice that an obstacle is detected or that the traveling selection screen D3 is displayed. In this case, in order to avoid a risk of contact between the work vehicle 10 and the obstacle, the output processing part 215 outputs the traveling stop instruction to the work vehicle 10. Specifically, in a case where the reception processing part 217 does not receive either the traveling stop instruction or the traveling continuation instruction, the traveling processing part 113 causes the work vehicle 10 to stop automatic traveling. For example, in a case where the operator does not press either the traveling stop button B1 or the traveling continuation button B2 until a predetermined time elapses after the display processing part 216 has displayed the traveling selection screen D3, or after the detection processing part 112 has detected a person, the output processing part 215 outputs the traveling stop instruction to the work vehicle 10.

In this way, in a case where an obstacle (person) is detected by the detection processing part 112, and in a case where the reception processing part 217 does not receive either the traveling stop instruction or the traveling continuation instruction until a predetermined time elapses, the traveling processing part 113 causes the work vehicle 10 to stop automatic traveling. In other words, the work vehicle 10 stops traveling and working, in a case where an obstacle is detected, and an instruction is not received from the operator.

Herein, the predetermined time may be a fixed time that is set in advance, or may be a time depending on a size of an obstacle when the obstacle is detected. For example, in a case where a size of the obstacle in the captured image is large, a distance between the work vehicle 10 and the obstacle becomes short, as compared with a case where the size of the obstacle in the captured image is small. Therefore, the operation control part 21 sets the predetermined time short, as the size of the obstacle in the captured image increases. Also, the operation control part 21 sets the predetermined time long, as the size of the obstacle in the captured image decreases. This allows a reception time of the traveling stop instruction and the traveling continuation instruction to be shortened, in a case where the distance between the work vehicle 10 and the obstacle is short, and a reception time of the traveling stop instruction and the traveling continuation instruction to be extended, in a case where the distance between the work vehicle 10 and the obstacle is long. Note that, the traveling processing part 113 may decelerate the work vehicle 10 during the predetermined time.

Note that, the operation control part 21 may inform the operator of information indicating that the work vehicle 10 has detected an obstacle. For example, the operation control part 21 may output a sound (warning sound), when the work vehicle 10 has detected an obstacle.

When the operator gives the traveling resume instruction on the operation terminal 20 after the work vehicle 10 has stopped by the traveling stop instruction, the reception processing part 217 receives the traveling resume instruction, and the output processing part 215 outputs the traveling resume instruction to the work vehicle 10. When the traveling processing part 113 of the work vehicle 10 acquires the traveling resume instruction from the operation terminal 20, the traveling processing part 113 causes the work vehicle 10 to resume traveling and working.

Note that, the operation terminal 20 may be accessible to a website (agricultural support site) of agricultural support services provided by a server (not illustrated) via the communication network N1. In this case, the operation terminal 20 is able to function as an operation terminal for the server by causing the operation control part 21 to execute a browser program. Further, the server includes each processing part described above, and performs each piece of processing.

As another embodiment, each function of the vehicle control device 11 and the detection processing device 19 described above may be included in the operation control part 21 of the operation terminal 20. In other words, for example, the operation control part 21 may acquire image data on a captured image from each camera 15 of the work vehicle 10, and perform processing of detecting an obstacle. Also, each function (the acquisition processing part 111 and the detection processing part 112) of the detection processing device 19 may be included in the vehicle control device 11.

[Automatic Traveling Processing]

Figure 10:
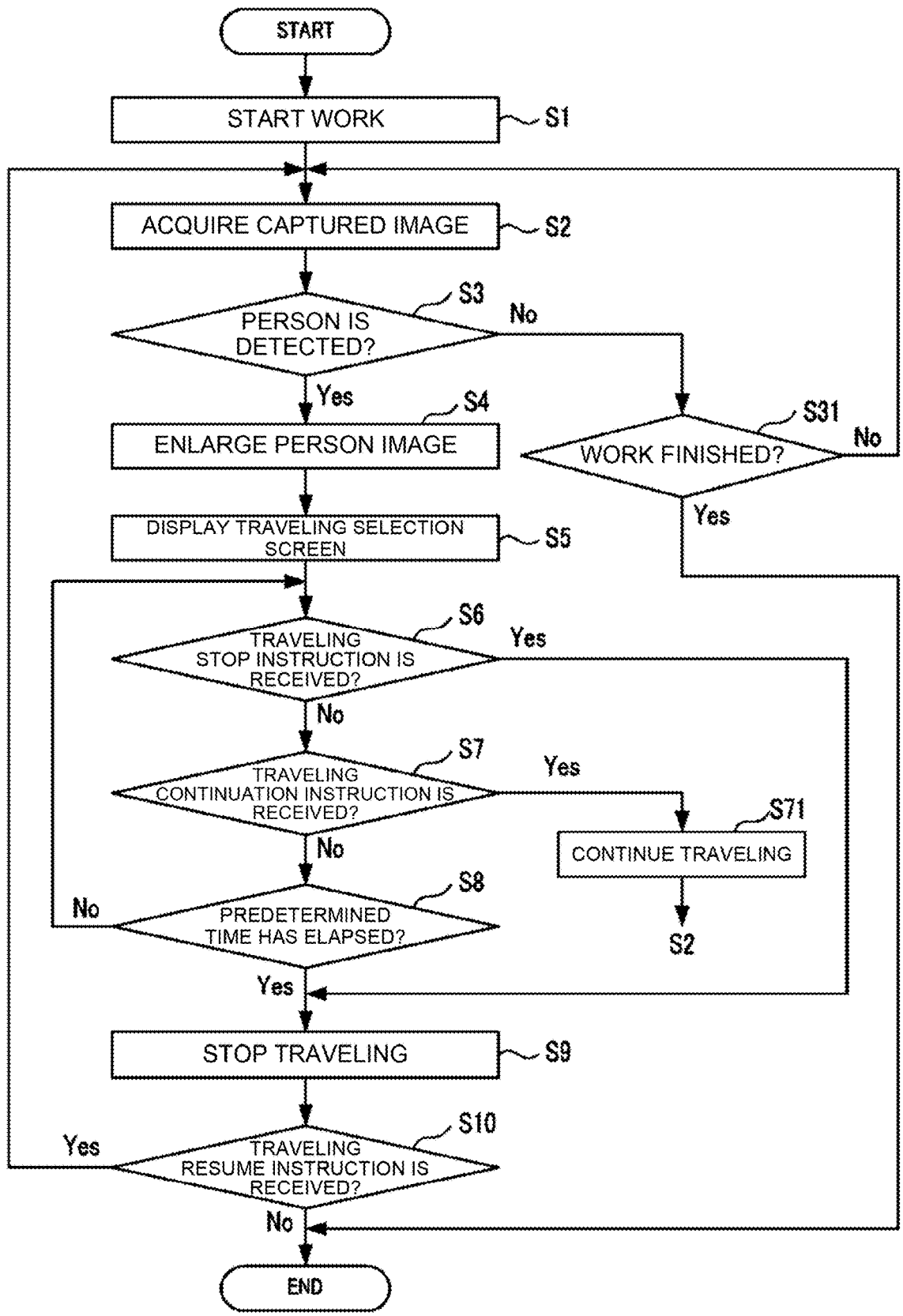
FIG. 10 is a flowchart illustrating an example of a procedure of automatic traveling processing to be performed by the automatic traveling system according to the embodiment of the present invention.

An example of the automatic traveling processing to be performed by the vehicle control device 11, the detection processing device 19, and the operation control part 21 is described with reference to FIG. 10. For example, the automatic traveling processing is started by the vehicle control device 11, the detection processing device 19, and the operation control part 21, in a case where the work vehicle 10 starts automatic traveling. Note that, the invention of the present application may be regarded as an invention directed to an automatic traveling method in which the vehicle control device 11, the detection processing device 19, and the operation control part 21 perform a part or all of the automatic traveling processing, or as an invention directed to an automatic traveling program for causing the vehicle control device 11, the detection processing device 19, and the operation control part 21 to perform a part or all of the automatic traveling method. Also, the automatic driving processing may be executed by one or more processors.

In step S1, the vehicle control device 11 causes the work vehicle 10 to start working. For example, when the operator presses the work start button on the operation screen of the operation terminal 20, the operation control part 21 outputs a work start instruction to the work vehicle 10. When the vehicle control device 11 acquires the work start instruction from the operation terminal 20, the vehicle control device 11 causes the work vehicle 10 to start automatic traveling. This allows the work vehicle 10 to start automatic traveling along the traveling route R, and a work by the work machine 14 is started.

Next, in step S2, the detection processing device 19 acquires a captured image from each of the cameras 15 installed on the work vehicle 10. For example, the detection processing device 19 acquires a captured image (frame image) from each of the five cameras 15F, 15B, 15R, 15L, and 15C continuously at a predetermined frame rate.

Next, in step S3, the detection processing device 19 detects an obstacle (e.g., a person) in the acquired captured images. Specifically, the detection processing device 19 determines whether a person is included in a detection area, based on the captured images. In a case where the detection processing device 19 detects a person (S3: Yes), the processing proceeds to step S4. On the other hand, in a case where the detection processing device 19 does not detect a person (S3: No), the processing is shifted to step S31.

In step S31, the vehicle control device 11 determines whether the work vehicle 10 has finished the work. In a case where the work vehicle 10 has finished the work (S31: Yes), the processing is terminated. On the other hand, in a case where the work vehicle 10 has not finished the work (S31: No), the processing returns to step S2. In this way, in a case where the detection processing device 19 does not detect a person, the work vehicle 10 performs traveling and working, while acquiring captured images until a predetermined work is finished.

Further, the detection processing device 19 outputs, to the operation terminal 20, image data on the acquired captured image, identification information of the camera 15 associated with the captured image, and a determination result indicating whether a person is included in the captured image. When the operation control part 21 acquires the image data from the detection processing device 19 of the work vehicle 10, the operation control part 21 causes to display the captured image P1 in each image display column L1 (see FIG. 6B).

In step S4, the operation control part 21 causes to display the captured image including a person in an enlarged manner. For example, in a case where a person is detected in a captured image associated with the camera 15L (camera 4), as illustrated in FIG. 8A, the operation control part 21 enlarges the image display column L1 associated with the camera 15L (camera 4), and causes to display the captured image P1 in an enlarged manner. This allows the image of the person detected as an obstacle to be displayed in an enlarged manner.

Next, in step S5, the operation control part 21 causes to display, on the operation display part 23, the traveling selection screen D3 for selecting a traveling stop instruction to stop traveling of the work vehicle 10, or a traveling continuation instruction to continue traveling (see FIG. 9).

Next, in step S6, the operation control part 21 determines whether the traveling stop instruction is received from the operator on the traveling selection screen D3. For example, when the operator presses the traveling stop button B1 on the traveling selection screen D3 illustrated in FIG. 9, the operation control part 21 receives the traveling stop instruction (S6: Yes), and the processing is shifted to step S9. On the other hand, in a case where the operator does not press the traveling stop button B1 on the traveling selection screen D3 illustrated in FIG. 9 (S6: No), the processing is shifted to step S7.

Next, in step S7, the operation control part 21 determines whether the traveling continuation instruction is received from the operator on the traveling selection screen D3. For example, when the operator presses the traveling continuation button B2 on the traveling selection screen D3 illustrated in FIG. 9, the operation control part 21 receives the traveling continuation instruction (S7: Yes), and the processing is shifted to step S71. On the other hand, in a case where the operator does not press the traveling continuation button B2 on the traveling selection screen D3 illustrated in FIG. 9 (S7: No), the processing is shifted to step S8.

In step S71, the operation control part 21 does not cause the work vehicle 10 to stop traveling and working, but causes the work vehicle 10 to continue traveling and working. Thereafter, the processing returns to step S2.

In step S8, the operation control part 21 determines whether a predetermined time has elapsed. Specifically, the operation control part 21 determines whether the predetermined time has elapsed without receiving either the traveling stop instruction or the traveling continuation instruction since the operation control part 21 displayed the traveling selection screen D3, or since the detection processing device 19 detected a person. In a case where the predetermined time has elapsed without receiving either the traveling stop instruction or the traveling continuation instruction (S8: Yes), the processing is shifted to step S9. In a case where the predetermined time has not elapsed (S8: No), the processing returns to step S6.

In step S9, the operation control part 21 outputs the traveling stop instruction to the work vehicle 10, and the vehicle control device 11 causes the work vehicle 10 to stop traveling and working.

In step S10, the operation control part 21 determines whether a traveling resume instruction is received from the operator. When the operation control part 21 receives the traveling resume instruction from the operator (S10: Yes), the processing returns to step S2. On the other hand, in a case where the operation control part 21 does not receive the traveling resume instruction from the operator (S10: No), the processing is terminated. The vehicle control device 11, the detection processing device 19, and the operation control part 21 repeatedly perform pieces of the processing of steps S1 to S10 until the work vehicle 10 finishes working.

As described above, the automatic traveling system 1 according to the present embodiment acquires the captured image P1 from the camera 15 installed on the work vehicle 10, and detects an obstacle, based on the captured image P1. Also, the automatic traveling system 1 receives a traveling stop instruction to stop automatic traveling of the work vehicle 10, or a traveling continuation instruction to continue automatic traveling, in a case where the obstacle is detected. Further, the automatic traveling system 1 causes the work vehicle 10 to stop automatic traveling, in a case where the traveling stop instruction is received, and causes the work vehicle 10 to continue automatic traveling, in a case where the traveling continuation instruction is received. This allows the operator to select whether to stop automatic traveling or to continue automatic traveling, in a case where the work vehicle 10 has detected an obstacle during automatic traveling. For example, in a case where the obstacle is an obstacle that does not interfere with automatic traveling, the work vehicle 10 continues automatic traveling without stopping by allowing the operator to give an instruction to continue automatic traveling, thereby preventing lowering of work efficiency. In addition, for example, in a case where the obstacle is an obstacle that interferes with automatic traveling, the operator can secure safety by stopping automatic traveling, removing the obstacle, and the like. Then, the operator can resume automatic traveling, in a case where safety of the work vehicle 10 is secured. Thus, it is possible to prevent lowering of work efficiency, while securing safety of the work vehicle 10.

Further, in a case where the work vehicle 10 has detected an obstacle during automatic traveling, and in a case where the operator does not perform either an operation of stopping automatic traveling, or an operation of continuing automatic traveling within a predetermined time, the automatic traveling system 1 stops automatic traveling. This can avoid a situation in which the work vehicle 10 continues automatic traveling and comes into contact with an obstacle without being noticed by the operator.

The present invention is not limited to the embodiment described above, but the following embodiments may be available.

In the embodiment described above, in a case where an obstacle (person) is detected by the detection processing part 112, and in a case where the reception processing part 217 does not receive either the traveling stop instruction or the traveling continuation instruction until a predetermined time has elapsed, the traveling processing part 113 causes the work vehicle 10 to stop automatic traveling. As another embodiment, in a case where an obstacle is detected by the detection processing part 112, and in a case where the reception processing part 217 does not receive either the traveling stop instruction or the traveling continuation instruction until the distance between the work vehicle 10 and the obstacle reaches a predetermined distance, the traveling processing part 113 may cause the work vehicle 10 to stop automatic traveling.

Figure 11:
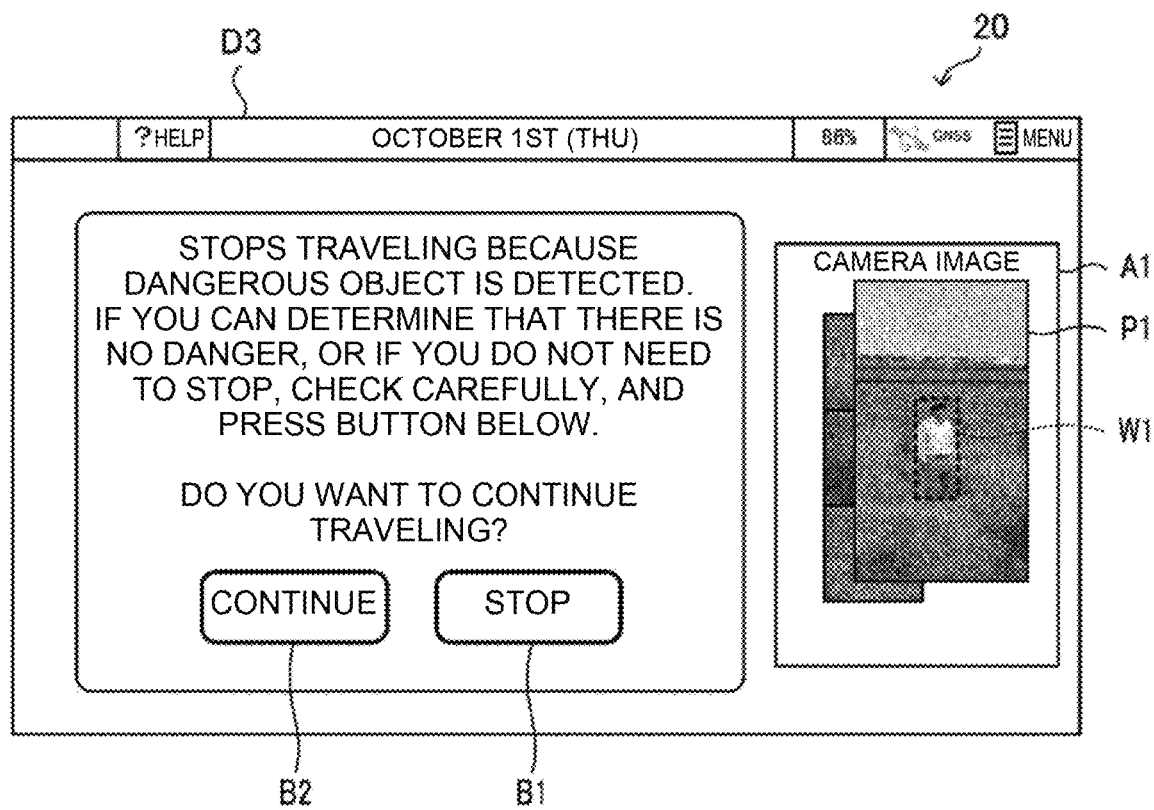
FIG. 11 is a diagram illustrating an example of a traveling selection screen to be displayed on the operation terminal according to the embodiment of the present invention.

The operation control part 21 may compute a change in distance between the work vehicle 10 and the obstacle, based on successive frame images to be acquired from the work vehicle 10. For example, as illustrated in FIG. 11, the operation control part 21 may compute the distance, based on a size of a frame W1 surrounding a person in the captured image P1.

Herein, the predetermined distance may be a predetermined fixed distance, or may be a distance depending on a size of an obstacle when the obstacle is detected. For example, in a case where a size of the obstacle in the captured image is large, a distance between the work vehicle 10 and the obstacle becomes short, as compared with a case where the size of the obstacle in the captured image is small. Therefore, the operation control part 21 sets the predetermined distance short, as the size of the obstacle in the captured image increases. Also, the operation control part 21 sets the predetermined distance long, as the size of the obstacle in the captured image decreases. This allows a reception time of the traveling stop instruction and the traveling continuation instruction to be shortened, in a case where the distance between the work vehicle 10 and the obstacle is short, and a reception time of the traveling stop instruction and the traveling continuation instruction to be extended, in a case where the distance between the work vehicle 10 and the obstacle is long. Note that, the traveling processing part 113 may decelerate the work vehicle 10 during the predetermined distance.

As another embodiment, for example, in a case where the detection processing part 112 detects a specific person, and the operator gives a traveling continuation instruction, and thereafter, in a case where the detection processing part 112 detects the same person again, the work vehicle 10 may continue automatic traveling without acquiring a traveling continuation instruction from the operator. This improves convenience because it is not necessary to request the operator to select a traveling stop instruction or a traveling continuation instruction, for example, each time the same obstacle that does not interfere with automatic traveling is detected.

Further, in the present embodiment, obstacle detection and determination are performed based on an image captured by a camera, but, as another embodiment, a camera and Lidar (obstacle detection sensor) may be used together. Specifically, obstacle detection may be performed by the Lidar, and obstacle determination may be performed by the camera. The obstacle detection sensor may be a sensor utilizing an ultrasonic wave or the like.

The invention claimed is:

1. An automatic traveling method comprising:
    acquiring a captured image from an imaging part installed on a work vehicle;
    detecting, based on the captured image, an obstacle to be acquired;
    determining, subsequent to detecting the obstacle and while the work vehicle is automatically traveling, whether a traveling stop instruction to stop automatic traveling of the work vehicle or a traveling continuation instruction to continue automatic traveling, has been input by an operator; and
    when it is determined that the traveling continuation instruction has been input by the operator, continuing automatic traveling of the work vehicle.

2. The automatic traveling method according to claim 1, further comprising, in a case where neither the traveling stop instruction nor the traveling continuation instruction has been input by the operator, stopping automatic traveling of the work vehicle.

3. The automatic traveling method according to claim 2, further comprising, in a case where the obstacle is detected, and neither the traveling stop instruction nor the traveling continuation instruction has been input by the operator once a predetermined time elapses, stopping automatic traveling of the work vehicle.

4. The automatic traveling method according to claim 3, wherein the predetermined time is set to a shorter time, as a size of the obstacle included in the captured image increases, and is set to a longer time, as the size of the obstacle included in the captured image decreases.

5. The automatic traveling method according to claim 2, further comprising, in a case where the obstacle is detected, and neither the traveling stop instruction nor the traveling continuation instruction has been input by the operator once a distance between the work vehicle and the obstacle reaches a predetermined distance, stopping automatic traveling of the work vehicle.

6. The automatic traveling method according to claim 5, wherein the predetermined distance is set to a shorter distance, as a size of the obstacle included in the captured image increases, and is set to a longer distance, as the size of the obstacle included in the captured image decreases.

7. The automatic traveling method according to claim 1, wherein the imaging part includes a plurality of imaging parts installed at different locations of the work vehicle, and the automatic traveling method further comprises:
    displaying, side by side on an operation terminal, a plurality of captured images to be acquired, included as the captured image, and associated with the plurality of the imaging parts; and
    displaying the captured image in which the obstacle is detected in a highlighted manner among the plurality of the captured images.

8. The automatic traveling method according to claim 7, further comprising:
    receiving a setting operation of setting a layout of the plurality of captured images to be displayed on the operation terminal; and
    arranging and displaying the plurality of captured images on the operation terminal according to the setting operation.

9. An automatic traveling system comprising:
    an acquisition processing part configured to acquire a captured image from an imaging part installed on a work vehicle;
    a detection processing part configured to detect an obstacle, based on the captured image to be acquired by the acquisition processing part;
    a reception processing part configured to determine, subsequent to detecting the obstacle and while the work vehicle is automatically traveling, whether a traveling stop instruction to stop automatic traveling of the work vehicle or a traveling continuation instruction to continue automatic traveling, has been input by an operator; and a traveling processing part configured to, when it is determined that the traveling continuation instruction has been input by the operator, continue automatic traveling of the work vehicle.

10. An automatic traveling program stored on a non-transitory computer readable medium, the automatic traveling program configured to, when executed by one or more processors, cause the one or more processors to perform operations comprising:

acquiring a captured image from an imaging part installed on a work vehicle;

detecting, based on the captured image, an obstacle to be acquired;

determining, subsequent to detecting the obstacle and while the work vehicle is automatically traveling, whether a traveling stop instruction to stop automatic traveling of the work vehicle or a traveling continuation instruction to continue automatic traveling, has been input by an operator; and when it is determined that the traveling continuation instruction has been input by the operator, continuing automatic traveling of the work vehicle.

* * * * *